United States Patent [19]

Sweeney et al.

[11] 3,874,816

[45] Apr. 1, 1975

[54] WINDMILL BLADE

[76] Inventors: Thomas E. Sweeney, 95 Hartley Ave., Princeton, N.J. 08540; Walter B. Nixon, 30 Merritt Dr., Trenton, N.J. 08638

[22] Filed: Oct. 23, 1973

[21] Appl. No.: 408,837

[52] U.S. Cl.............. 416/139, 416/132, 416/240
[51] Int. Cl............................................. F03d 7/00
[58] Field of Search ............ 416/132, 139, 23, 240

[56] References Cited
UNITED STATES PATENTS

| | | | |
|---|---|---|---|
| 192,668 | 7/1877 | Alexander | 416/23 |
| 1,417,000 | 5/1922 | Vogt et al. | 416/139 |
| 2,015,777 | 10/1935 | Belding | 416/132 |
| 2,622,686 | 12/1952 | Chevreau et al. | 416/41 X |
| 2,633,921 | 4/1953 | Monney | 416/132 |

FOREIGN PATENTS OR APPLICATIONS

| | | | |
|---|---|---|---|
| 968,411 | 4/1950 | France | 416/11 |
| 974,952 | 10/1950 | France | 416/11 |
| 1,006,698 | 1/1952 | France | 416/41 |
| 236,749 | 7/1911 | Germany | 416/139 |
| 536,478 | 12/1955 | Italy | 416/11 |

*Primary Examiner*—Everette A. Powell, Jr.
*Attorney, Agent, or Firm*—Michael W. York

[57] ABSTRACT

A windmill blade that has a rigid leading edge, a rigid root portion and a movable blade tip. Control of the geometric twist of the windmill blade is accomplished through proper selection of the axis of rotation for the movable blade tip and by controlling the position of the windmill blade tip with a servo motor or by controlling the position of the windmill blade tip with a spring and a weight. The ability to vary the geometric twist of the blade enables the frequency of rotation of the blade to be controlled to reduce wind drags upon the blade. This improved windmill blade eliminates the need for current complicated and expensive rotor hubs which are used to vary the blade pitch angle at the root end of the blade to reduce wind drag upon the blade.

10 Claims, 12 Drawing Figures

FIG. I

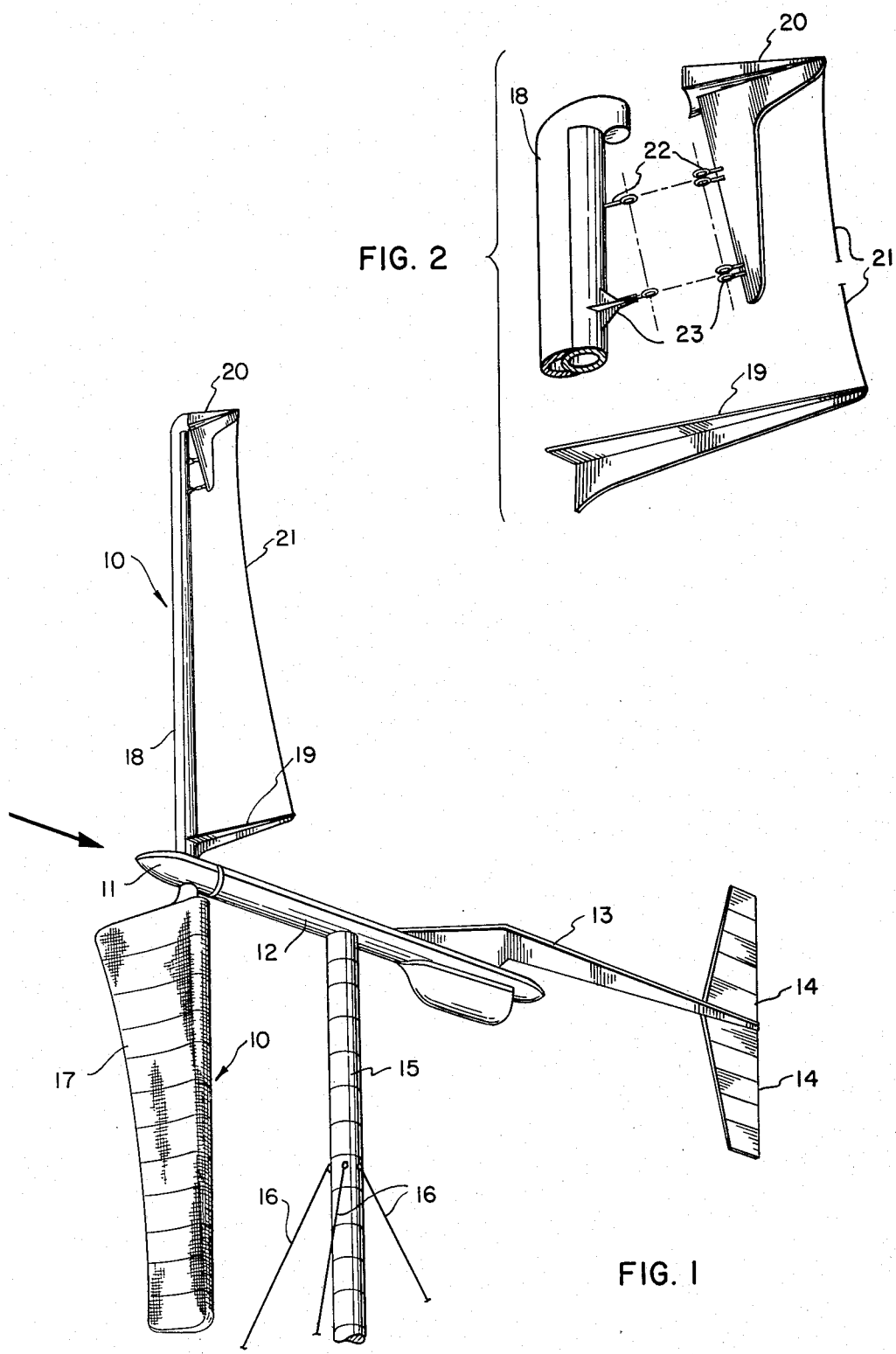

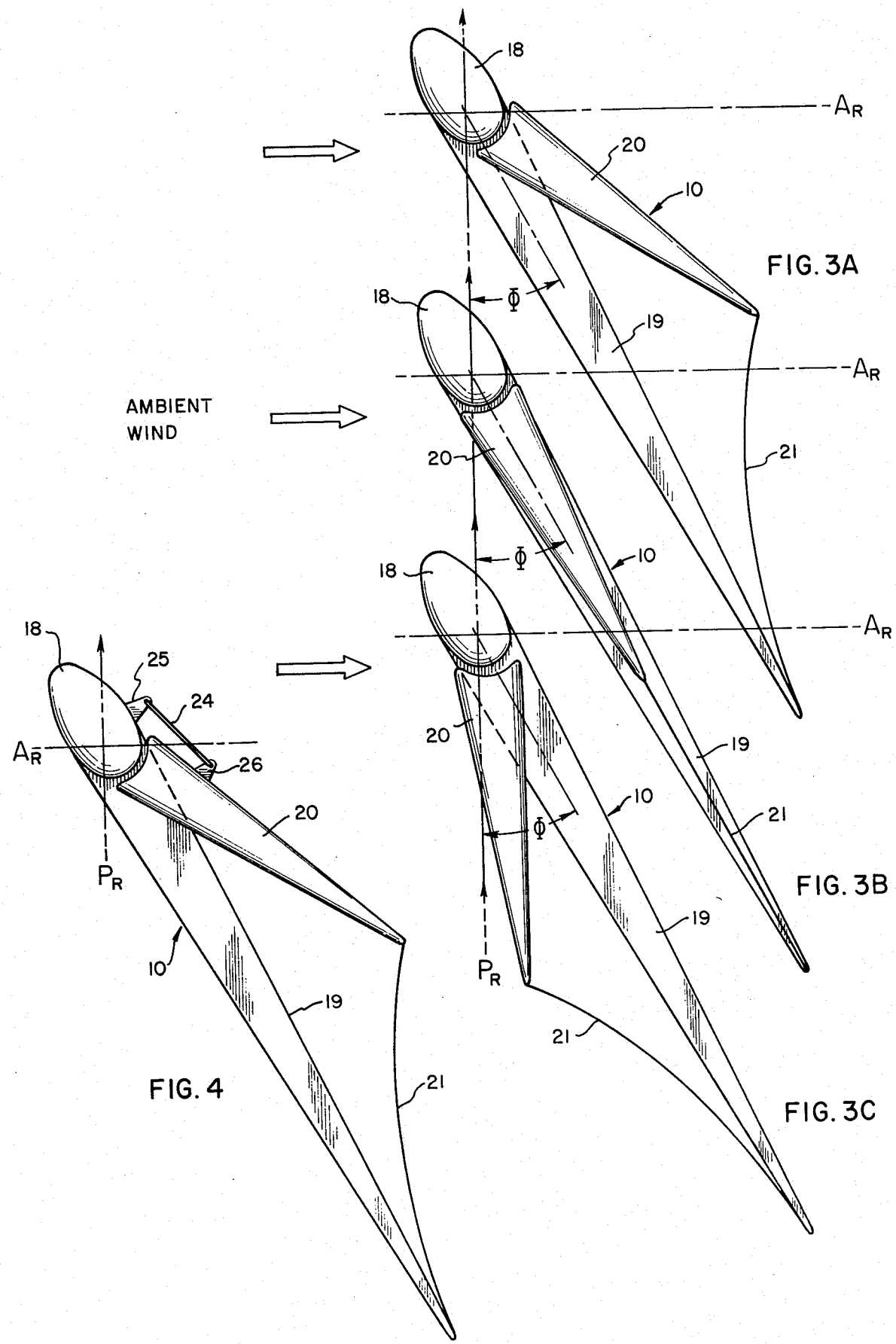

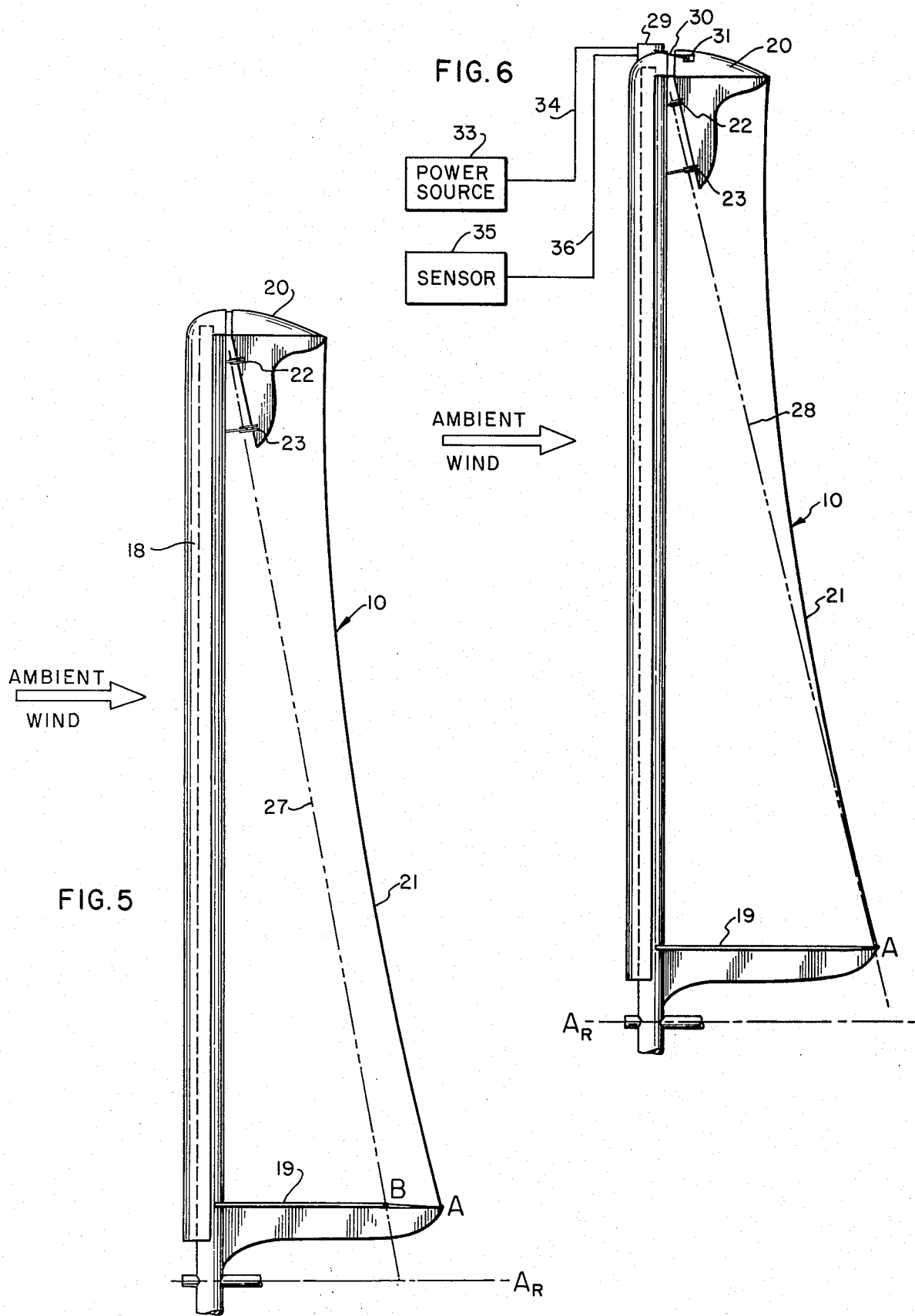

WINDMILL BLADE

BACKGROUND OF THE INVENTION

Windmills have been in use for many hundreds of years and they have been used to harness the energy of the wind to perform numerous tasks. For instance, windmills have been used to grind grain, operate pumps and other machinery and more recently in the earlier portion of this century to generate electric power. Many farms in this country used windmills to generate electricity to light lamps before electric power was widely available.

Unfortunately, the windmills which were in use on farms were inefficient and gave something less than entirely satisfactory results. Consequently, as soon as electric power from central generating plants became available such windmills were no longer used to generate electricity and there appeared to be little future for electricity generating windmills.

The current threat of an energy crisis has caused a search for additional sources of electrical power and as a consequence the possibility of generating electrical power through the use of windmills is being re-examined. As it turns out, the advances which have been made in aerodynamics in recent years can possibly greatly improve the efficiency of windmills and permit them to be used as an economical source of electrical power.

One of the major problems associated with using windmills to generate electricity is the problem of wind drag loads on the windmill blades. These loads severely limit the structural efficiency of a windmill electric generating system and they increase with increasing revolutions per minute, r.p.m., of the windmill blades. In the past, these undesirable effects of wind drag have been reduced by varying the blade pitch angle at the root of the blade, in a manner similar to aircraft propellers, through the use of complicated and expensive rotor hub assemblies which vary the pitch angle of the entire windmill blade.

Through the use of this invention it is now possible to have an economic windmill which can be used to generate electricity by reducing the undesirable effects of wind drag without the need for a complex and expensive rotor hub assembly.

SUMMARY OF THE INVENTION

This invention relates to windmills and more particularly to windmill blade systems which are designed to reduce the effects of wind drag upon the windmill blades.

It is accordingly an object of the present invention to provide a windmill blade which is capable of reducing undesirable wind drag upon the blade.

It is an object of the invention to provide a windmill blade which is capable of reducing undesirable effects of wind drag by controlling the frequency of revolution of the blade.

It is an object of the present invention to provide a windmill blade which reduces the effect of undesired wind drag without requiring a complicated and expensive rotor hub.

It is also an object of the present invention to provide a windmill blade that is twistable to prevent undesired high frequencies of revolution and the associated high wind drag imposed upon the blade.

It is also an object of the present invention to provide a windmill blade that is particularly adapted for use in generating electric power.

It is a further object of this invention to provide a semi-rigid windmill blade that tends to return to its neutral or untwisted configuration when not being subjected to winds that tend to produce high frequencies or revolution of the blade.

It is a further object of the present invention to provide a semi-rigid twistable windmill blade in which the degree of twist is readily controllable.

It is also an object of the present invention to provide a windmill blade that is capable of reducing the undesirable effects of wind drag at high rotor revolutions per minute without requiring the blade pitch angle at the root of the blade to be varied.

It is also an object of the present invention to provide a windmill blade which permits control of the frequency of revolution of the rotor and windmill blades by varying the position of the windmill blade tip.

The present invention provides a windmill blade that has a rigid leading edge, a rigid root portion connected to the rigid leading edge and a movable tip member that is operatively connected to the outer end portion of the rigid leading edge and is movable to various positions to vary the twist of the blade.

BRIEF DESCRIPTION OF THE DRAWINGS

The invention will be hereinafter more fully described with references to the accompanying drawings in which:

FIG. 1 is a perspective view of windmill blades of the present invention in use as part of a windmill;

FIG. 2 is a view of portions of one of the windmill blades illustrated in FIG. 1;

FIGS. 3A, 3B, and 3C are end views of the windmill blade illustrated in FIGS. 1 and 2 showing its reaction at various revolutions of the rotor hub and windmill blades;

FIG. 4 is an end view of the blade illustrated in FIGS. 3A, 3B, and 3C illustrating how the location of the movable blade tip can be fixed in one embodiment of the invention;

FIG. 5 is a side view of one embodiment of the windmill blade of the invention illustrating the location of the axis of rotation of the blade tip;

FIG. 6 is a side view of another embodiment of the windmill blade of this invention illustrating the location of the axis of rotation of the blade tip;

DETAILED DESCRIPTION OF THE PREFERRED EMBODIMENTS

Figures 7A, 7B, 7C, 8:
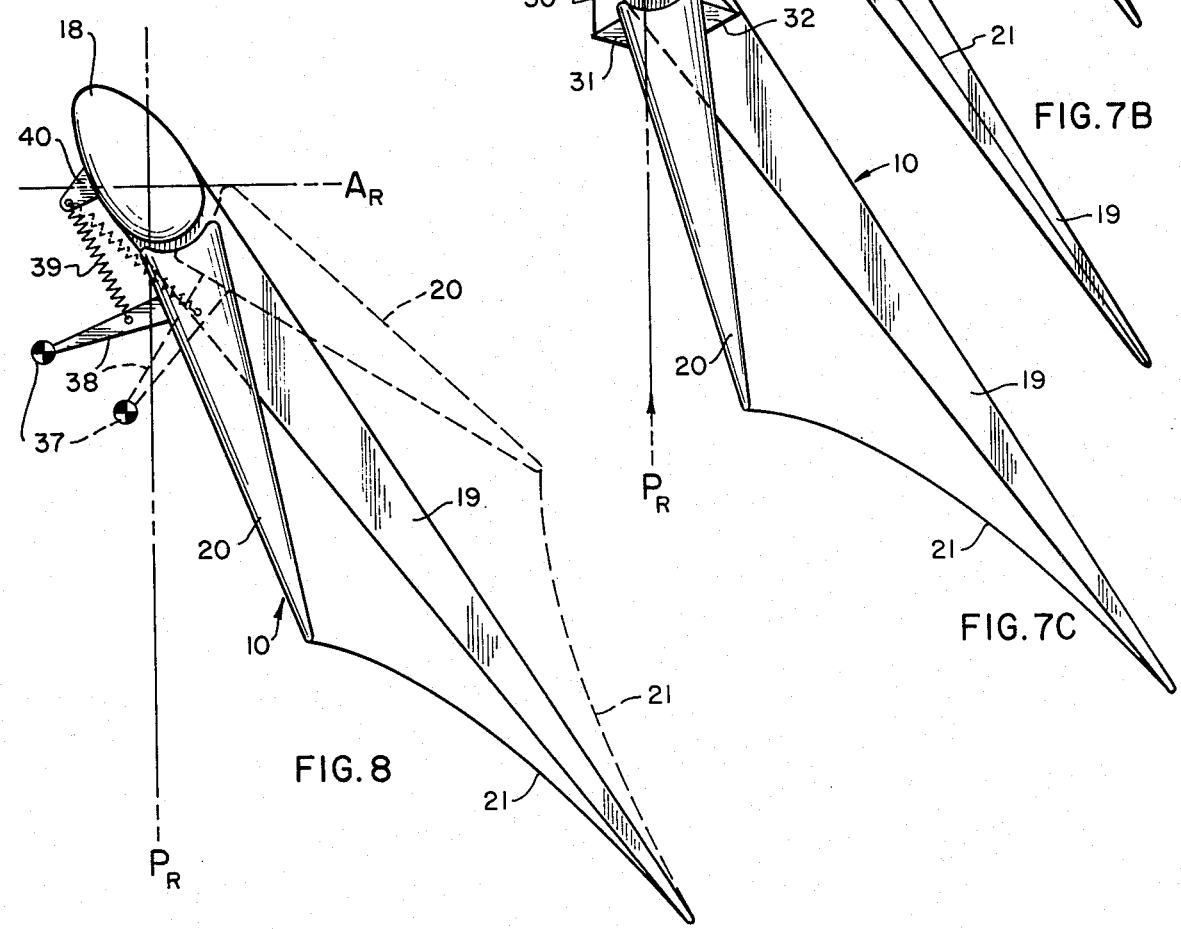
FIGS. 7A, 7B, and 7C are end views of the windmill blade illustrated in FIG. 6 illustrating various positions of the windmill blade tip.
FIG. 8 is an end view of another embodiment of the windmill blade of the present invention.

Referring first to FIG. 1 in the drawings two windmill blades of the present invention are illustrated and are generally designated by the number 10. As illustrated the blades 10 are connected at their root ends to a blade or rotor hub 11 which is rotatably mounted on the forward end of a windmill body 12 which has a tail boom 13 with two outward extending stabilizing tail fins 14 at its aft end. The windmill body 12 is in turn rotatably mounted on the upper end of the upward extending cylindrical windmill mast 15 which is assisted in being supported in a vertical position by the support wires 16.

The blades 10 are covered by a sailcloth or covering 17 that has been omitted from the upper blade in FIG. 1 in order to illustrate the internal structure of the blade. FIG. 1 that illustrates an uncovered blade 10 and FIG. 2 which illustrates portions of the same uncovered blade illustrate that the blade 10 comprises a rigid elongated leading edge member 18, a rigid root end member 19 that is rigidly connected to the lower portion of the rigid leading edge member, and a movable blade tip member 20 which is operatively connected to the outer end portion of the rigid leading edge member.

The blade 10 also comprises a flexible elongated trailing edge member 21 whose respective ends are connected to the outer end of the movable blade tip member 20 and the outer end of the root end member 19 and hinge members 22 and 23 which rotatably connect the blade tip member 20 to the upper portion of the rigid leading edge member 18.

As illustrated in FIGS. 3A, 3B, and 3C which are enlarged end views of one of the blades 10 illustrated in FIG. 1 with the covering or sailcloth 17 removed, the blade tip member 20 is rotatable to the side to vary the twist of the blade. In FIGS. 3A, 3B, and 3C it should be noted that the plane of rotation of the blade 10 is illustrated and designated by the symbol $P_R$ and that the axis of rotation for the hub 11 and blades 10 is illustrated and is designated by the symbol $A_R$. In addition, the assumed direction of the ambient wind is illustrated by the arrows and the pitch angle of the rigid blade root end member 19 relative to the plane of rotation is illustrated and is designated by the symbol $\Phi$. The pitch angle $\Phi$ of the rigid root end member 19 will be set at an angle, which is readily determinable by those skilled in the art, to give optimum performance for given design wind conditions and design power output requirements. This angle $\Phi$ is fixed by fixing the location of the blade root member 19 with respect to the rotor hub 11 to which it is connected.

FIG. 3A illustrates the desired position of the blade tip member 20 when the blade 10 is exposed to an ambient wind of comparatively high velocity so that the blade 10 will not tend to rotate at a comparatively high r.p.m. and thus not be subjected to high wind drag loads which the blade would be subject to if the blade tip member was not located in the illustrated rotated position. In this position, it should be noted that elongated flexible member 21 which may be a cable is curved to the right side of the centerline of the blade root end member 19 and hence away from the plane of rotation $P_R$ for the blades 10.

FIG. 3B illustrates the desired position of the blade tip member 20 when the blade 10 is exposed to an ambient wind of moderate velocity so that the blade is not rotating or tending to rotate at a comparatively high r.p.m. that would subject the blade to undesired high wind drag loads. In this position, the centerline of the blade tip member 20 is substantially in line with the centerline of the rigid root end member 19 when viewed from the end of the blade and the blade 10 is in an untwisted state.

In FIG. 3C, the blade 10 is illustrated in the desired position when the blade is exposed to an ambient wind of comparatively low velocity. In this position, the rotatable blade tip member 20 is rotated toward the oncoming ambient wind or toward the plane of rotation $P_R$ and the flexible elongated member 21 is curved in a direction toward the oncoming wind. As a consequence, the blade 10 is twisted in a direction toward the advancing wind and the plane of rotation $P_R$. In this position blade r.p.m. tends to increase. It will, of course, be appreciated that the position of the blade tip member will vary from the representative positions illustrated in FIGS. 3A, 3B, and 3C depending upon the wind conditions.

As illustrated in FIG. 4, it is possible particularly in cases where the blade 10 is to be exposed to relatively constant ambient wind velocities or where optimum performance is not necessary to fix the location of the blade tip member 20 with respect to the rigid root end member 19 by means of a rigid link 24 or the like. One end of the link 24 is rigidly connected to the outer end of a connecting horn 25 which extends outward from the upper portion of the side of the rigid leading edge member 18 that is not directly exposed to the oncoming ambient wind. The other end of the link 24 is rigidly connected to the outer end of a connecting horn 26 which extends outward from the side of the forward portion of the blade tip member 20 which is also not directly exposed to the oncoming ambient wind. As a consequence, the blade tip member 20 is held in a position similar to that illustrated in FIG. 3A which prevents the blade 10 from achieving a high r.p.m. in a comparatively strong wind and thus the blade avoids the undesirable effects of wind drag.

The length of the link 24 would be determined before assembly of the blade to give the proper blade tip member angle and hence blade twist for the best performance under the expected ambient wind conditions. It will, of course, be appreciated that the embodiment of the invention illustrated in FIG. 4 may not give good results under all conditions and in general its use should be avoided in fluxuating wind conditions and under conditions requiring high efficiency.

Another embodiment of the invention is illustrated in FIG. 5. As illustrated, in FIG. 5, the blade 10 has the same rigid leading edge member 18, rigid root end member 19, movable blade tip member 20 and hinge members 22 and 23 which rotatably connect the blade tip member to the rigid leading edge member as previously described in connection with the previously described blades 10. However, the hinge axis of the blade tip member 20 or the axis about which the tip member rotates has been selected to give the blade some important and unexpected qualities.

As illustrated in FIG. 5, which illustrates the blade 10 with its covering or sailcloth 17 removed, a straight line extension 27 of the hinge axis intercepts the rigid root member 19 at a point B which is located forward of the point A which is the rearmost point of the root member 19. It has been determined experimentally that when the blade 10 has a hinge axis or axis of rotation which will result in the intercept B, that although the blade is twistable of course since the blade tip member 20 is free to rotate, it also has built in stability since the trailing edge member 21 or the trailing edge of the blade naturally returns to its neutral or in-plane position with respect to the plane formed by the centerlines of the leading edge member 18 and the root end member 19 when the blade is not under external loads.

Furthermore, it has been determined that this effect which might be termed a spring effect increases as the intercept B is moved further forward from the point A.

It has also been determined that it is not necessary or desirable to locate the point B at a distance forward of the point A at which the axis of rotation and the straight line extension thereof would be substantially parallel to the long axis of the rigid leading edge member 18.

Another embodiment of the invention is illustrated in FIG. 6 and in FIGS. 7A, 7B, and 7C. FIG. 6 is a side view illustrating the blade 10 without any covering or sailcloth 17 and it is important to note that it has all of the same components of the previously described blades 10. However, it is also important to note that a straight line extension 28 of the blade tip member hinge axis or axis of rotation intercepts the root end member 19 at the point A which is the rearmost point of the root end member whereas in the embodiment illustrated in FIG. 5 the intercept occurred at a point B forward of the point A. When the hinge axis is located so that extension line intercepts point A, the blade 10 has no stability of spring effect. However, such a situation is desired for this particular embodiment of the invention.

As illustrated in FIG. 6 and also in FIGS. 7A, 7B, and 7C a servo motor 29 is located on the outer end of the leading edge member 18 and the servo motor is operatively connected to the rotatable tip member 20 by means of a flexible drive member 30 such as a cable or chain whose respective ends are connected to control horns 31 and 32 that extend outward from the respective sides of the blade tip member 20. The central portion of the drive member 30 is engaged by a suitable drive mechanism, known in the art, which is located within and forms part of the servo motor 29.

As illustrated in FIG. 7A, when high ambient wind velocity conditions exist that would tend to induce a high blade r.p.m., the motor 29 is activated to cause its drive mechanism to pull the portion of the flexible drive member 30 that is connected to the control horn 32 inward toward the motor and at the same time to let out or permit the extension of that portion of the flexible drive member 30 that is connected to the control horn 31. This causes the blade tip member 20 to be pivoted toward the axis of rotation $A_R$ for the rotor hub 11 and blades 10 and this results in the blade being kept at a comparatively low r.p.m. and not being subject to high wind drag even though the velocity of the ambient wind is high.

FIG. 7B illustrates the desired configuration for the blade 10 when it is only exposed to comparatively moderate ambient wind velocities which would not induce high wind drag. Under these circumstances, the motor 29 is activated to pull in and let out appropriate portions of the flexible drive member 30 to rotate the blade tip member 20 in the appropriate direction so that its centerline is substantially in line with the centerline of the root end member 19 when it is viewed from the end of blade 10. This, of course, results in an untwisted blade 10 which is suitable for operation under these wind conditions.

In FIG. 7C, the motor 29 has been activated to let out that portion of the flexible drive member 30 which is connected to the control horn 32 and to pull in that portion of the flexible drive member which is connected to the control horn 31. This results in a blade 10 which is twisted toward the plane of rotation for the blades $P_R$ as a result of the blade tip member 20 being rotated toward the plane of rotation. As previously indicated, this is the desired position when the blade 10 is exposed to low ambient wind velocities since this blade configuration tends to result in a desired increase in blade r.p.m.

As previously indicated, it is important in this embodiment that the straight line extension 28 of the blade tip member hinge axis or axis of rotation intercept the root member 19 at the point A so that the blade would have no spring effect. This situation is desirable in this embodiment because it is highly desirable that mechanical hinge movements be as near zero as possible since the position of the blade tip member 20 and hence the blade twist is under the control of the servo motor 29 and any spring effect might interfere with this control.

It will, of course, be appreciated that other components would be utilized with the invention illustrated in FIG. 6 and in FIGS. 7A, 7B, and 7C. These include some power supply for the motor 29 and some sensing device of one type or another. One of the most logical power sources would of course be a source of power from an electric generator within the windmill body if the windmill is to be used to generate electric power. The sensor could be either sensitive to blade r.p.m., wind velocity, or even generated electric power from the windmill. In any event, since such power sources and sensors are well known in the art, they are only shown in block diagram form in FIG. 6 where the power source 33 is illustrated as being operatively connected to the motor 29 by a conductor 34 and the sensor 35 is operatively connected to the motor by a conductor 36.

Another embodiment of the invention is illustrated in FIG. 8. As illustrated, this embodiment has the same blade 10 with a rigid leading edge member 18, a rigid root member 19 and a rotatable blade tip member 20 which were discussed with respect to the previous embodiments. However, a weight 37 is connected to the side of the blade tip member 20 that faces the plane of rotation of the blade $P_R$ by the weight extension member 38 whose outer end is connected to the weight and whose inner end is connected to the side of the movable blade tip member. A spring 39 has one of its ends connected to the weight extension member 38 and its other end is connected to the outer end of a connecting member 40 which projects outward from the upper end of the rigid leading edge member 18. This spring 39 biases the blade tip member 20 so that it tends to rotate forward toward the plane of rotation $P_R$ for the blade As illustrated in FIG. 8 in view of the spring 39, the blade is normally twisted toward the plane of rotation $P_R$ when the blade is only subjected to relatively low ambient wind velocities and thus the blade 10 is automatically in the desired configuration as previously described for low wind velocity conditions. As the ambient wind velocity increases, the wind exerts a force upon the blade 10 which to at least some extent tends to cause the blade tip member 20 to rotate toward the axis of rotation $A_R$ for the blades and hub, and thus the aerodynamic wind forces tend to diminish blade twist whereas the forces exerted by the spring 39 tend to increase blade twist.

As the r.p.m. of the blade 10 increases, centrifugal forces acting on the weight 37 cause the weight to move outward away from the axis of rotation $A_R$. As a consequence at high blade r.p.m., the blade tip member 20 would be in the position illustrated by the phantom lines in FIG. 8. As previously indicated for the other embodiments of the invention, this is the desired position of the blade tip member 20 when the blade is exposed to relatively high wind velocities which would tend to increase blade r.p.m. and cause high wind drag on the blade because this position of the blade tip member tends to reduce blade r.p.m. and thus reduce wind drag.

In the embodiment illustrated in FIG. 8, it is also desirable that a straight line extension of the hinge axis or axis of rotation of the blade tip member 20 intercept the rigid root member 19 at a point B that is located forward of the point A, the rearmost point of the root end member 19, in the manner described for and illustrated in FIG. 5. Consequently, in the embodiment illustrated in FIG. 8, the aerodynamic wind forces, the forces exerted by the spring 39, the centrifugal forces acting on the weight 37 and the forces caused by the inherent stability of the blade due to the proper location of the hinge axis all interact to determine the amount of blade twist.

It will be appreciated that strength of the spring 39, the heaviness of the weight 37 and the location for the intercept point B will be determined for each particular windmill design based on such factors as expected average wind velocity, peak wind gust velocity, constancy of the winds and the required operating efficiency.

In order to use this invention, the expected wind conditions and the required operating efficiency are considered. Based upon these factors, one of the embodiments of the invention is selected. These factors will also govern the choice of an A or B intercept, force of the spring 39, heaviness of the weight 37, type of sensor as appropriate in the manner previously described and other appropriate features related to the selected type of blade and its control system. The selected blades 10 are then rigidly connected in an appropriate manner at their root ends to the rotor hub 11 of a windmill as illustrated in FIG. 1. In most cases the windmill will be used to generate electric power. In this case a suitable electric generator is located within the windmill body 12 and is appropriately connected to the rotor hub 11 so that electric power is generated as the blades 10 and the rotor hub rotate. Neither the electric generator nor the interconnecting mechanism have been shown or described since they are well known in the art and do not form part of this invention.

Although the windmill blade of this invention is particularly useful in windmills designed to generate electric power, it can also be utilized to advantage on other types of windmills. In these instances, appropriate shafts, gears and other equipment which are known in the art and form no part of this invention would be used to transmit the power derived from the wind.

Although the invention has been described in considerable detail with reference to certain preferred embodiments, it will be understood that variations and modifications may be made within the spirit and scope of the invention as defined in the appended claims.

What is claimed is:

1. A windmill blade comprising a rigid leading edge portion, a rigid root portion connected to said rigid leading edge portion, a rotatable tip member rotatably connected to the outer end portion of said rigid leading edge portion, said rotatable tip member being rotatable about an axis of rotation so positioned that a straight line extension thereof in a direction toward said rigid root portion intercepts said rigid root portion at a point located forward of the aft end thereof, an elongated flexible member having one end thereof connected to said rotatable tip member and the other end thereof connected to the aft end of said rigid root portion and weight means operatively connected to said rotatable tip member for controlling the position of said tip member and the consequent twist of said blade.

2. The windmill blade of claim 1 wherein said intercept point is located substantially no further forward from the aft end of said root portion than a point at which said axis of rotation and the straight line extension thereof would be substantially parallel to the long axis of said rigid leading edge.

3. The windmill blade of claim 1 wherein said weight means is operatively connected to the side of the rotatable tip member which faces the plane of rotation of said blade.

4. The windmill blade of claim 3 further comprising weight extension means extending from said rotatable tip member to said weight means.

5. The windmill blade of claim 4 further comprising resilient means connected to said weight extension means for biasing said rotatable tip member in a direction toward the plane of rotation of said blade.

6. The windmill blade of claim 1 further comprising resilient means operatively connected to said rotatable tip member for biasing said movable tip member in a direction toward the plane of rotation of said blade.

7. The windmill blade of claim 6 wherein said resilient means comprises a spring.

8. The windmill blade of claim 1 further comprising a covering for said blade.

9. The windmill blade of claim 8 further comprising a rotor hub member connected to said blade.

10. The windmill blade of claim 9 further comprising a windmill body and wherein said rotor hub member is rotatably mounted on said windmill body.

* * * * *